Dec. 27, 1927.

C. S. WOELFL 1,654,202

VEHICLE SUSPENSION SPRING

Filed Aug. 25, 1924      3 Sheets-Sheet 1

Inventor
C. S. Woelfl

Dec. 27, 1927.
C. S. WOELFL
1,654,202
VEHICLE SUSPENSION SPRING
Filed Aug. 25, 1924
3 Sheets-Sheet 2
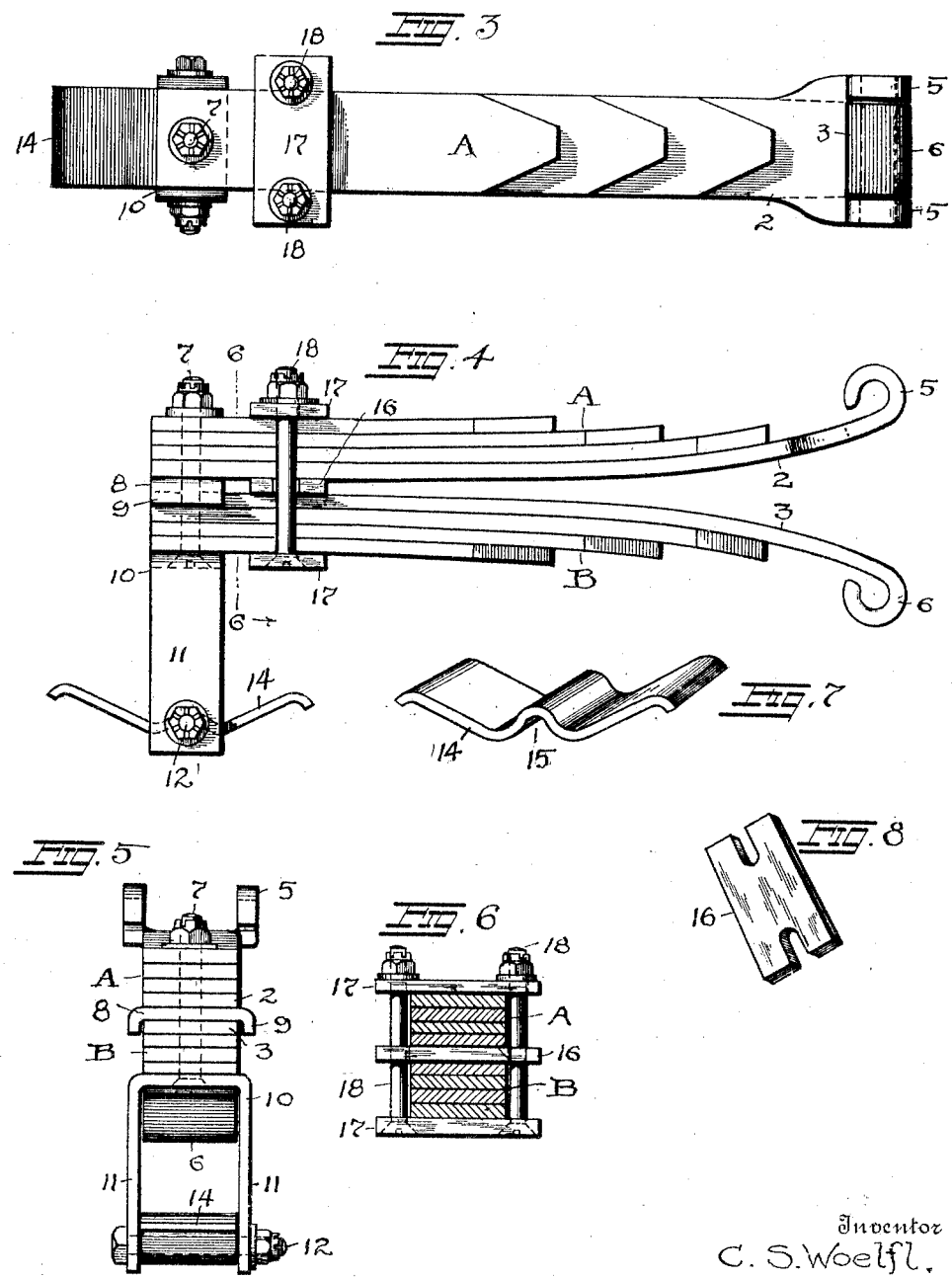

Dec. 27, 1927.
C. S. WOELFL
1,654,202
VEHICLE SUSPENSION SPRING
Filed Aug. 25, 1924      3 Sheets-Sheet 3
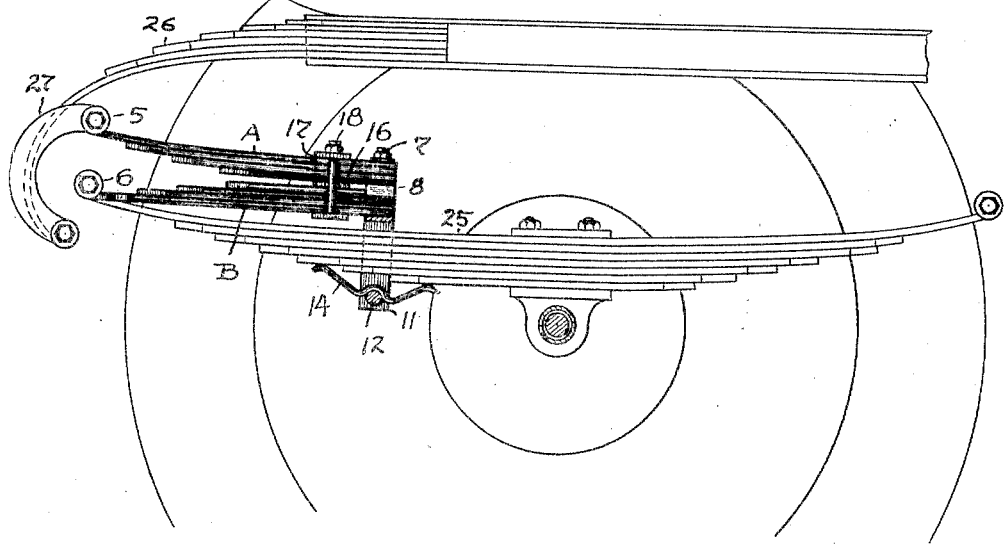
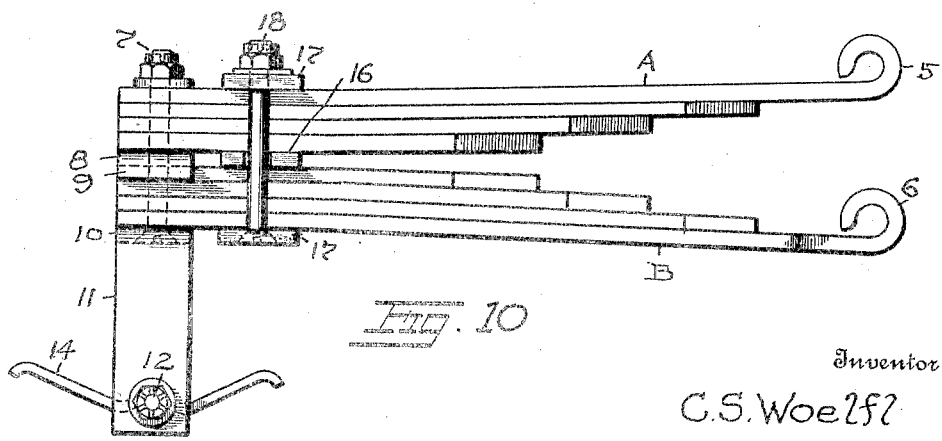
Inventor
C. S. Woelfl Patented Dec. 27, 1927.

1,654,202

UNITED STATES PATENT OFFICE.

CHARLES S. WOELFL, OF CLEVELAND, OHIO, ASSIGNOR OF ONE-THIRD TO J. P. SMITH AND ONE-THIRD TO O. J. RINGLE, BOTH OF CLEVELAND, OHIO.

VEHICLE SUSPENSION SPRING.

Application filed August 25, 1924. Serial No. 733,893.

My invention relates to an improvement in vehicle suspension springs, and comprises more particularly an attachment for the main suspension springs of an automobile, the general object being to provide a set of supplementary leaf springs adapted to enhance the riding qualities of the main springs and also permit the flexibility or resiliency of the spring assembly to be modified or changed with convenience and despatch so that the supplemental springs may be attached and used on cars of different kinds or types and accommodate varying loads and conditions with equal facility and without breakage.

Figure 1:
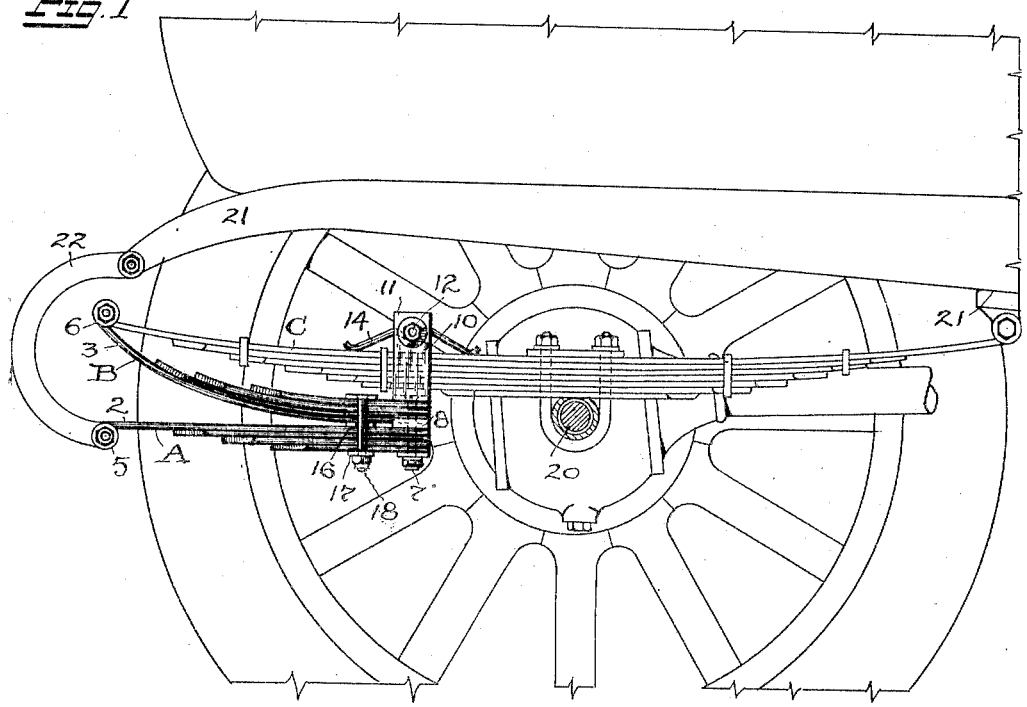
Figure 2:
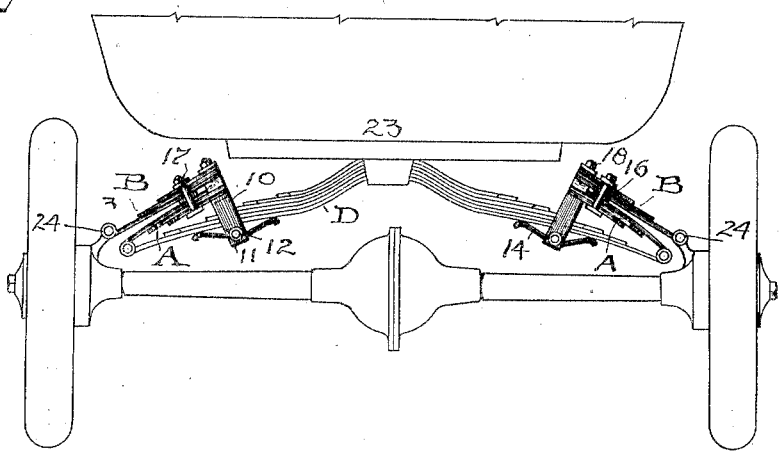

In the accompanying drawings, Fig. 1 is a side elevation of the rear part of a vehicle equipped with a semi-elliptic main spring and supplemental springs according to my invention. Fig. 2 is a rear view of a vehicle having a transversely arranged main spring and a set of my improved supplemental springs connected therewith. Figs. 3 and 4 are top and side views, respectively, on an enlarged scale, of my improved supplemental springs unattached or alone. Fig. 5 is an end elevation of the spring shown in Fig. 4. Fig. 6 is a vertical section of the spring on line 6—6 of Fig. 4. Fig. 7 is a perspective view of the spring clamp used to attach the supplemental spring to the main spring, and Fig. 8 is a perspective view of the spreader plate which is used between the diverging spring sections. Fig. 9 is a side view of my improved supplemental spring slightly modified and connected with a three-quarter elliptic suspension spring, and Fig. 10 is an enlarged side view of this modified form of supplemental spring.

Now referring first to Figs. 3 to 8, inclusive, the attachment or supplementary spring comprises a pair of short laminated spring sections A and B respectively, each made of superposed spring leaves of varying length which are squared and fastened together at their butt or base ends. The longer leaves 2 and 3 of sections A and B, respectively, are formed with eyes or loops 5 and 6 at their outer extremities to permit a hinge or pivot connection to be made therewith. As shown, leaf 2 of section A has a widened and bifurcated eye end 5, and leaf 3 of section B has a single eye end 6 of the same width as leaf 3. The spring leaves of said two sections are curved longitudinally and all the leaves are rigidly united together at their butt ends by a single rivet or bolt 7 which passes through a spacing member 8 having angularly bent extremities or lips 9 adapted to engage the side edges of one of the adjacent spring leaves. A yoke member 10 is also secured to the outer leaf of one of said spring sections by the same bolt 7, and the legs 11 of this yoke member are adapted to straddle and confine a laminated main spring, such for example as the semi-elliptic spring C shown in Fig. 1, or a laminated spring D of the type shown in Fig. 2. The outer ends of legs 11 are formed with bolt openings to receive a fastening bolt 12, and in order that a slidable cushioning union may be effected with the main spring I insert an arched spring member 14 between bolt 12 and the face of the main spring and form this spring member 14 with a central transverse depression 15 to seat the bolt and secure said member in working position.

The two spring sections A and B are spaced apart substantially their full length, being straight and parallel near their butt ends where united together and curved apart a substantial distance at their eye ends to permit the two sections to flex relatively to each other. Under extreme loads the two spring sections may even flex until in contact, and in order that the degree of flexibility of the two sections may be increased or decreased to meet different conditions and requirements when the sections are connected to a main spring, I provide an adjustable separating plate 16 between the two sections, and a pair of clamping plates 17—17 and bolts 18 adapted to cooperate with bolt 7 in uniting the spring sections together at their butt ends. Separating plate 16 is notched at its opposite ends to permit bolts 18 to pass therethrough and prevent displacement of the plate longitudinally of the two spring sections, and the clamping plates 17 and separating plate 16 may be readily shifted lengthwise of the spring sections and fastened more or less distantly from spacer plate 8 and the butt ends of the springs thereby stiffening the action of both spring sections more or less according to any given need or requirement.

A pair of diverging laminated spring sections A and B as described may be connected to a main suspension spring of a vehicle in various ways. Thus in Fig. 1 I show a semi-elliptic main spring C fastened to the axle 20 of a vehicle and hinged at one end to the body or frame 21 of the vehicle. The supplementary spring comprising divided sections A and B, is hinged at 6 to the longest leaf of the main spring and supported at its butt end from the body of the main spring by yoke 10 and its spring rider or arched member 14. The outer end of leaf 2 of spring section A is shackled or linked to the vehicle body or frame 21 by a link or pair of links 22 thus completing the connection whereby the load is carried to the main spring by and through the divided supplementary spring.

In Fig. 2, I show a bowed main spring D arranged transversely beneath one end of a vehicle body 23 and provided with a set of supplementary springs comprising divided sections A and B as herein described. In this case the supplementary springs are disposed above the main spring and inverted as compared with the spring assembly in Fig. 1, and one of the spring sections is hinged to a perch 24 extending from the axle or brake drum housing of the vehicle.

In Figs. 9 and 10, I show a supplementary spring constructed according to my invention but slightly modified and connected to a three-quarter elliptic suspension spring assembly. Thus a supplemental spring, composed of two divided and spaced spring sections A and B, with the shorter leaves inside and opposed, is disposed between one end of a semi-elliptic main spring 25 and a quarter-elliptic spring 26, the eye end of section A being connected to the eye end of the long top leaf of main spring 25 and the eye end of section B being connected by a shackle member or links 27 to the eye end of the long leaf of the quarter-elliptic spring 26. In this assembly the shorter spring leaves of the sections A and B face each other and the adjustable separating plate 16 may be shifted longitudinally between them to change the fulcrum or bending point of the spring leaves and vary their flexibility, and also to regulate the working space between the sections to prevent them from striking or bearing against each other at their free ends under excessive loads. The separating plate also prevents the spring leaves from buckling and breaking, and various adjustments may be made to obtain various degrees of motion between the spring sections and to adapt the supplemental spring to cars of different weights.

What I claim as my invention, is

1. A vehicle suspension spring, comprising a laminated main spring, and a pair of diverging spring leaf sections yoked at their butt ends to said main spring and having a separating and clamping device adjustable longitudinally of the two spring sections and adapted to modify the flexible action of said leaf sections.

2. A vehicle suspension spring, comprising a laminated main spring, a sectional supplementary spring adapted to slide at one end upon said main spring and having one of its sections pivotally connected with a part of said main spring, means adapted to connect the other section to a fixed part of the vehicle, and a longitudinally adjustable separating and clamping device on and for the separate sections of said supplementary spring.

3. A supplementary spring attachment for a vehicle suspension spring, comprising separate spring sections united together at their butt ends and having attachment eyes at their free extremities, and a separating member mounted between said spring sections and movable longitudinally thereof.

4. A supplementary spring attachment for a vehicle suspension spring, comprising a pair of diverging spring sections having a movable separating plate between them and means adapted to clamp said plate and sections together, said plate and clamping means being adjustable longitudinally of said spring sections.

5. A supplementary spring attachment for a vehicle suspension spring, comprising a pair of divided spring sections united together at one end and diverging apart at their opposite ends, and a longitudinally movable separating and clamping device adapted to clamp said sections together to vary the flexibility thereof.

6. A supplementary spring attachment for a vehicle suspension spring, comprising a pair of diverging spring sections, a notched separating plate seated between said sections, and clamping plates and bolts adapted to clamp said separating plate and said sections together, said notched separating plate and said clamping plates and bolts being movable lengthwise of said spring sections to vary the flexibility thereof.

7. A supplementary spring attachment for a vehicle suspension spring, comprising a pair of laminated spring sections secured together at their butt ends and curved apart at their opposite ends, each section having an attachment eye formed in its free end, a yoke member fixed to the butt end of said sections, a sliding support member secured to said yoke, a separating plate longitudinally movable seated between said sections, and a clamping device for said sections and plate, said clamping device and said plate being longitudinally adjustable on and between said laminated spring sections.

In testimony whereof I affix my signature.

CHARLES S. WOELFL.